US011722612B2

(12) United States Patent
Ikuma et al.

(10) Patent No.: US 11,722,612 B2
(45) Date of Patent: Aug. 8, 2023

(54) MULTIFUNCTION DEVICE, DISPLAY CONTROL METHOD OF MULTIFUNCTION DEVICE, AND NON-TRANSITORY COMPUTER-READABLE STORAGE MEDIUM STORING DISPLAY CONTROL PROGRAM

(71) Applicant: SEIKO EPSON CORPORATION, Tokyo (JP)

(72) Inventors: Ken Ikuma, Nagano (JP); Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/664,437

(22) Filed: May 23, 2022

(65) Prior Publication Data
US 2022/0377189 A1 Nov. 24, 2022

(30) Foreign Application Priority Data
May 24, 2021 (JP) ................................. 2021-086727

(51) Int. Cl.
*H04N 1/00* (2006.01)
(52) U.S. Cl.
CPC ..... *H04N 1/00509* (2013.01); *H04N 1/00413* (2013.01); *H04N 1/00506* (2013.01); *H04N 2201/0094* (2013.01)

(58) Field of Classification Search
CPC .......... H04N 1/00509; H04N 1/00413; H04N 1/00506; H04N 2201/0094
See application file for complete search history.

(56) References Cited

U.S. PATENT DOCUMENTS

| | | | |
|---|---|---|---|
| 11,372,539 B2 | 6/2022 | Oh et al. | |
| 2020/0267270 A1* | 8/2020 | Mori | ................... H04N 1/00509 |
| 2021/0142541 A1* | 5/2021 | Eisley | ................... G06T 1/0007 |
| 2021/0318799 A1* | 10/2021 | Oh | ....................... G06F 3/04845 |
| 2022/0217243 A1* | 7/2022 | Kumagai | ........... H04N 1/00514 |
| 2022/0276778 A1 | 9/2022 | Oh et al. | |

FOREIGN PATENT DOCUMENTS

| | | |
|---|---|---|
| CN | 112181219 A | 1/2021 |
| JP | 2020-136829 A | 8/2020 |
| JP | 2020-151957 A | 9/2020 |
| KR | 10-2021-0019935 A | 2/2021 |

* cited by examiner

*Primary Examiner* — Iriana Cruz
(74) *Attorney, Agent, or Firm* — Global IP Counselors, LLP

(57) ABSTRACT

A plurality of icons include a first icon set to a first setting by a hide instruction and a second icon set to a second setting by a hide instruction, and when an edit screen is displayed on an operation panel, the plurality of icons have different display modes between the first icon displayed on the edit screen and the second icon displayed on the edit screen.

7 Claims, 14 Drawing Sheets

MULTIFUNCTION DEVICE, DISPLAY CONTROL METHOD OF MULTIFUNCTION DEVICE, AND NON-TRANSITORY COMPUTER-READABLE STORAGE MEDIUM STORING DISPLAY CONTROL PROGRAM

The present application is based on, and claims priority from JP Application Serial Number 2021-086727, filed May 24, 2021, the disclosure of which is hereby incorporated by reference herein in its entirety.

BACKGROUND

1. Technical Field

The present disclosure relates to a multifunction device, a display control method of the multifunction device, and a non-transitory computer-readable storage medium storing a display control program.

2. Related Art

In the related art, a multifunction device having a plurality of functions such as a scanning function, a printing function, and a copying function has been known. The multifunction device is provided with an operation panel for instructing various settings and execution of various functions. JP-A-2020-151957 discloses a multifunction device including an operation panel for displaying various operation buttons. JP-A-2020-136829 discloses a configuration in which an application icon displayed on an operation panel is hidden according to a user.

When the user hides the operation buttons displayed on the operation panel as described in JP-A-2020-136829, it may not be desirable to hide a plurality of operation buttons uniformly.

SUMMARY

According to an aspect of the present disclosure, there is provided a multifunction device including: a reading unit that reads a document; a printing unit that performs printing on a medium; an operation panel that accepts instructions including an execution instruction and an edit instruction from a user and displays an operation screen including a plurality of icons and an edit screen including the plurality of icons; and a display control section that switches display of the operation panel to the operation screen or the edit screen, in which the operation panel accepts the execution instruction to execute the reading unit or the printing unit with the icon when the operation screen is displayed, the operation panel accepts the edit instruction including a hide instruction to hide the icon with the icon when the edit screen is displayed, the plurality of icons include a first icon set to a first setting by the hide instruction and a second icon set to a second setting by the hide instruction, and the display control section makes the display mode different between the first icon displayed on the edit screen and the second icon displayed on the edit screen when the edit screen is displayed on the operation panel.

According to another aspect of the present disclosure, there is provided a display control method of a multifunction device including a reading unit that reads a document, a printing unit that performs printing on a medium, and an operation panel that accepts instructions including an execution instruction and an edit instruction from a user and displays an operation screen and an edit screen, in which a plurality of icons include a first icon set to a first setting by a hide instruction included in the edit instruction and a second icon set to a second setting by the hide instruction, and the display control method includes switching display of the operation panel from the operation screen that accepts the execution instruction to execute the reading unit or the printing unit with the icon to the edit screen that accepts the edit instruction with the icon, and displaying the first icon and the second icon in different display modes when the edit screen is displayed on the operation panel.

According to another aspect of the present disclosure, there is provided a non-transitory computer-readable storage medium storing a display control program executed by a processor of a multifunction device including an operation panel that displays a plurality of icons and accepts instructions including an execution instruction and an edit instruction from a user, a reading unit that reads a document, and a printing unit that performs printing on a medium, the display control program causing the processor to execute: displaying the operation screen that accepts the execution instruction to execute the reading unit or the printing unit with the icon and the edit screen that accepts the edit instruction including a hide instruction with the icon on the operation panel in a switchable manner, the plurality of icons including a first icon set to a first setting by the hide instruction and a second icon set to a second setting by the hide instruction; and displaying the first icon and the second icon in different display modes when the edit screen is displayed.

DESCRIPTION OF EXEMPLARY EMBODIMENTS

Figure 1:
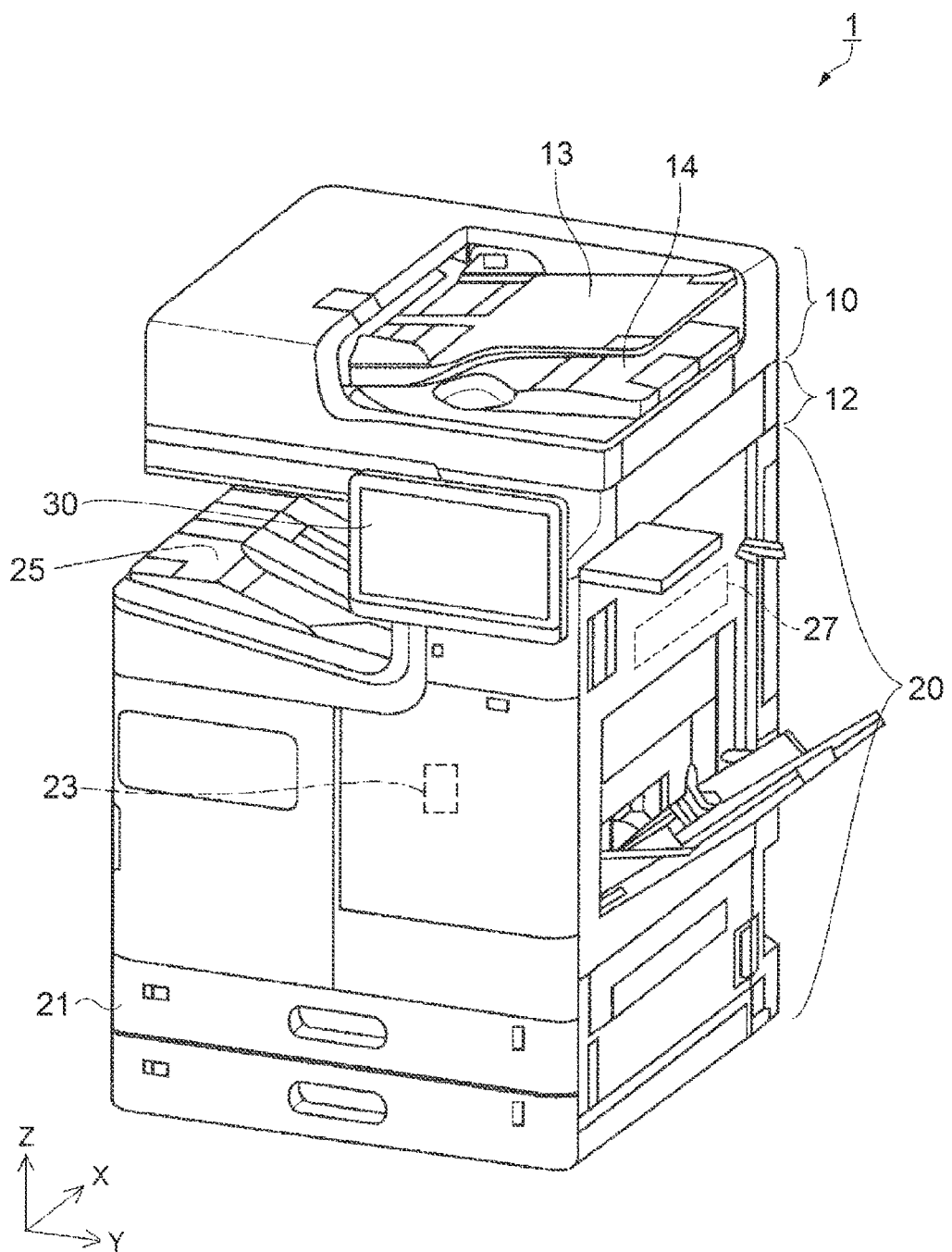
FIG. 1 is a diagram showing an outline of a multifunction device.

FIG. 1 is a perspective view showing an outline of a multifunction device 1. The multifunction device 1 includes a reading unit 10 for reading a document, a printing unit 20 for printing, and an operation panel 30.

The multifunction device 1 has a printing function of printing on a medium and a copying function of reading a document and printing the read data on the medium. The multifunction device 1 may have a scanning function of reading a document, generating and saving read data, a fax function of performing fax transmission of read data or data received from the outside. The fax function has a function of receiving fax data from the outside. The multifunction device 1 may have a call function of making a call and a mail function of transmitting a mail.

The reading unit 10 is mounted on a reading unit mounting table 12. The reading unit 10 includes a placement tray 13 on which documents are placed, and a document discharge tray 14 on which documents transported along a transport path are discharged. The reading unit 10 transports the documents placed on the placement tray 13 to the document discharge tray 14 along the transport path. A reading sensor (not shown) is provided in the transport path of the reading unit 10. The reading sensor reads an image formed on the document. The reading unit 10 corresponds to a reading section.

The printing unit 20 includes a paper cassette 21 on which a medium is placed, a printing mechanism 23, a printed matter discharge tray 25 for discharging the medium printed by the printing mechanism 23, and a processor 27 for performing various controls. The printing mechanism 23 of the present embodiment is an ink jet recording head that ejects ink to a medium for recording, but a mechanism other than the ink jet recording head may be used.

The printing unit 20 may optionally include a post-processing mechanism (not shown). The post-processing mechanism performs various processing on printed matter printed by the printing unit 20. The processes executed by the post-processing mechanism include a staple process of binding a plurality of printed matters with needles or the like, a punch process of making holes in the printed matter, a folding process of folding the printed matter in half, a shift process of shifting and discharging a plurality of printed matters for each copy, and the like. The post-processing mechanism performs one or more of these processes.

The operation panel 30 displays various icons 110. The icon 110 is an image displayed on the operation panel 30. The icon 110 is an image that accepts an execution instruction to be described later. The plurality of icons 110 displayed on the operation panel 30 are separated from each other. Details of the icon 110 will be described later. The operation panel 30 is a touch panel that accepts touch operations of the user. The operation panel 30 displays an operation screen 100 and an edit screen 105 in a switchable manner.

Figure 2:
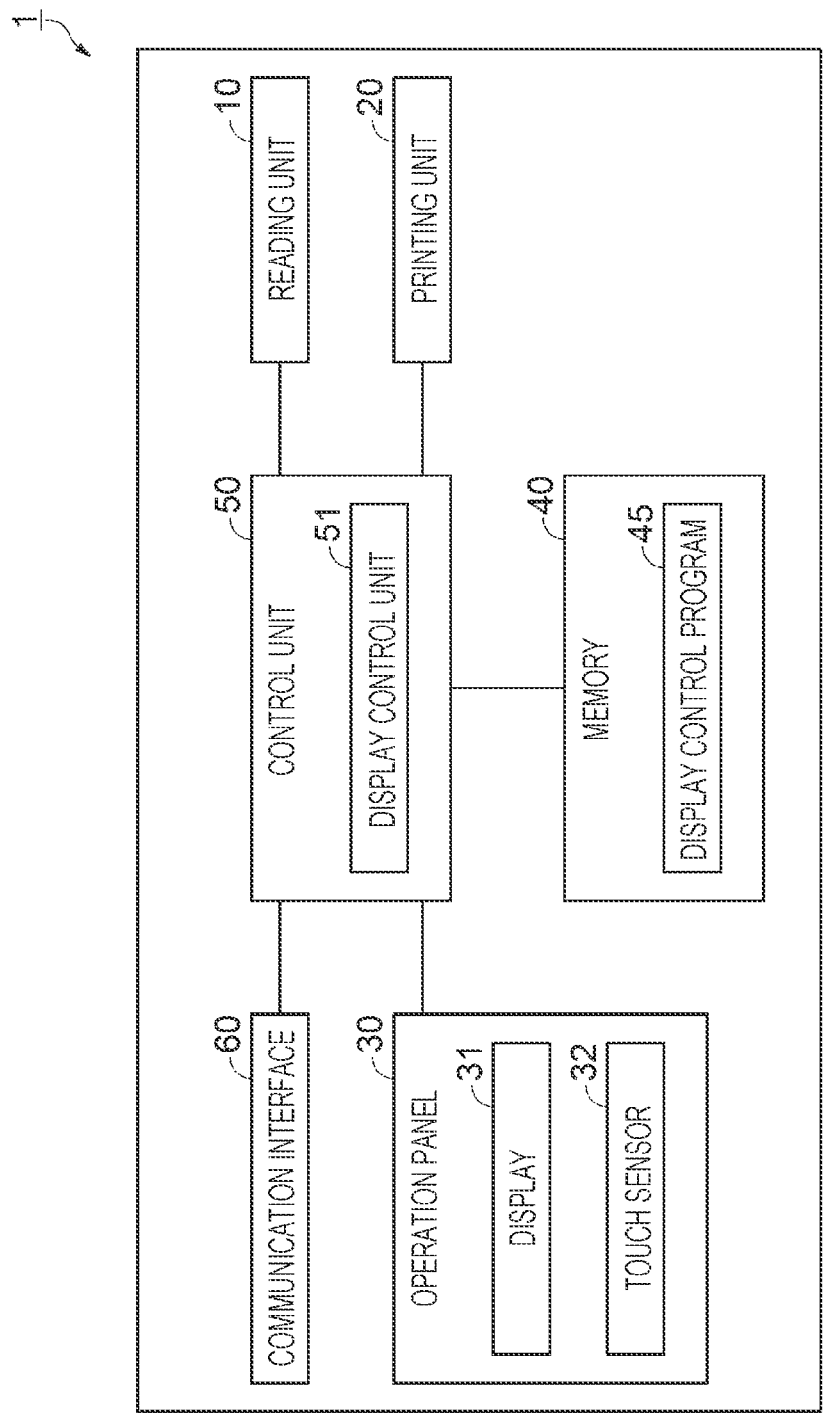
FIG. 2 is a diagram showing a functional block of the multifunction device.

FIG. 2 shows a functional block of the multifunction device 1.

The multifunction device 1 includes the reading unit 10, the printing unit 20, the operation panel 30, a memory 40, a control unit 50, and a communication interface 60.

The operation panel 30 includes a display 31 and a touch sensor 32. The display 31 is composed of a panel such as a liquid crystal panel and an organic electro-luminescence (EL), and displays the operation screen 100, the edit screen 105, and the like. The touch sensor 32 detects various touch operations input by a user. The operation panel 30 corresponds to a display section.

The memory 40 stores various programs such as a read control program that controls the operation of the reading unit 10, a print control program that controls the operation of the printing unit 20, and a display control program 45 that controls the display of the operation panel 30. The program may be composed of one or more packages. The memory 40 stores various data. The display control program 45 controls various displays to be displayed on the operation panel 30, such as a control for switching between the operation screen 100 and the edit screen 105, and a control for changing the display mode of the icon 110 edited on the edit screen 105.

The memory 40 is composed of a semiconductor storage element such as a flash read only memory (ROM) or another type of non-volatile storage device. The memory 40 may include a random access memory (RAM) that constitutes a work area. The memory 40 may be composed of a magnetic storage device such as a hard disk drive (HDD) or a semiconductor storage device such as a solid state drive (SSD).

The control unit 50 controls each section of the multifunction device 1. The control unit 50 is a controller including a processor 27. The control unit 50 executes the program stored in the memory 40. The control unit 50 receives various instructions based on the user's touch operation input to the touch sensor 32 of the operation panel 30. The control unit 50 controls the reading unit 10, the printing unit 20, the operation panel 30, and the communication interface 60 based on the received instructions. The control unit 50 corresponds to a control section.

The control unit 50 includes a display control unit 51. The display control unit 51 is a functional section implemented by the control unit 50 executing the display control program 45. The display control unit 51 controls the operation panel 30 and controls the display mode of the image to be displayed on the display 31. The display control unit 51 receives various instructions based on the user's touch operation input to the touch sensor 32. The display control unit 51 edits the icon 110 displayed on the display 31 of the operation panel 30 based on the received instruction. The display control unit 51 controls the display or hide of the edited icon 110. The display control unit 51 controls screen switching based on the received instruction. The display control unit 51 displays the operation screen 100, the edit screen 105, and the like on the display 31 by controlling the screen switching. The display control unit 51 corresponds to a display control section.

The communication interface 60 communicates with an external device (not shown), transmits output data output from the control unit 50 to the external device, and receives input data from the external device. The external devices include server devices such as cloud servers and mail servers, personal computers, smartphones, and the like. The connection between the communication interface 60 and the external device may be a wired connection via a cable, or may be a wireless connection according to an Ethernet (registered trademark) standard or the like. When the multifunction device 1 has a fax function or a call function, the communication interface 60 connects to a telephone line. When the multifunction device 1 connects to a cloud server or a mail server, the communication interface 60 connects to the Internet communication network.

Figure 3:
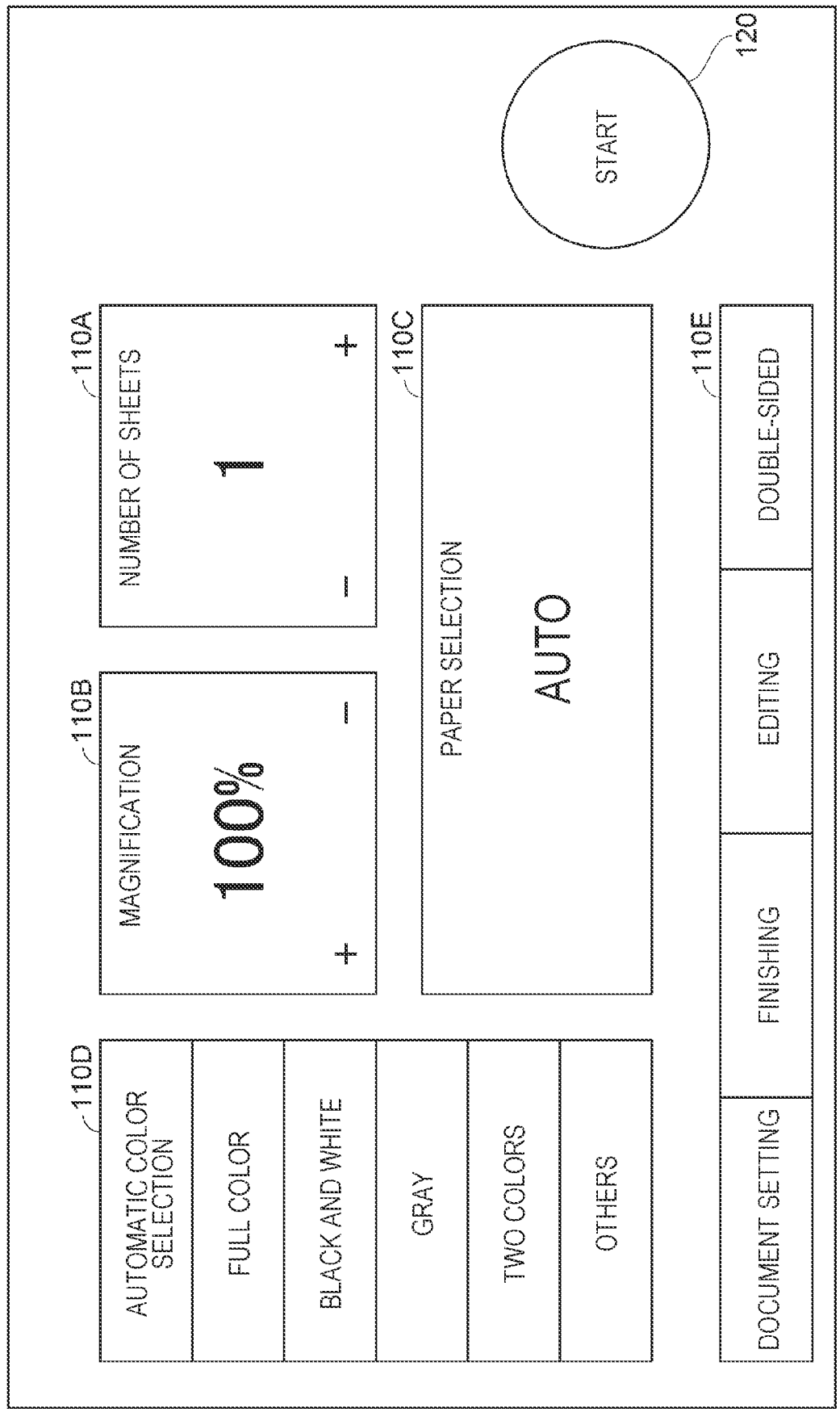
FIG. 3 is a diagram showing an operation screen displayed on an operation panel.

FIG. 3 shows the operation screen 100 displayed on the operation panel 30.

The operation screen 100 is a screen that accepts a user's touch operation and operates the multifunction device 1. The operation screen 100 accepts an execution instruction based on a user's touch operation input by the touch sensor 32. The execution instruction is transmitted to the control unit 50 by the operation panel 30, and instructs the control unit 50 to execute an operation or execute various settings for the reading unit 10, the printing unit 20, and the communication interface 60. The control unit 50 controls the operations of the reading unit 10, the printing unit 20, and the communication interface 60 based on the execution instruction. The execution instructions include execution instructions of various units and setting instructions of various units. The setting instruction involves instructing the settings for the reading unit 10, the printing unit 20, and the communication interface 60.

The operation panel 30 displays the operation screen 100 when the power of the multifunction device 1 is turned on or the like. The operation screen 100 displays the plurality of icons 110. The icon 110 has a plurality of types. The plurality of icons 110 displayed in FIG. 3 are a number-of-sheets designation icon 110A, a magnification designation icon 110B, a paper selection icon 110C, a color setting icon 110D, a printed matter designation icon 110E, and a start instruction icon 120. The number of sheets designation, magnification designation, paper selection, color setting, printed matter designation, and start instruction indicate the type of the icon 110. The icon 110 is a general term for various icons, and is used when various icons are not distinguished. The operation screen 100 displays the number-of-sheets designation icon 110A, the magnification designation icon 110B, the paper selection icon 110C, the color setting icon 110D, and the printed matter designation icon 110E in the same display mode.

The number-of-sheets designation icon 110A accepts settings related to the number of sheets of printed matter to be printed when printing or copying is performed by the multifunction device 1. The number-of-sheets designation icon 110A may accept the number of sheets by the number of touch operations by the user. The number-of-sheets designation icon 110A may accept an instruction to display a number-of-sheets setting screen for inputting the number of sheets based on a user's touch operation, and may display the number-of-sheets setting screen on the operation panel 30. "1" displayed on the number-of-sheets designation icon 110A in FIG. 3 indicates that the set number of sheets is one.

The magnification designation icon 110B accepts settings related to the scaling of the printed matter to be printed when printing or copying is performed by the multifunction device 1. The scaling of the printed matter is enlargement or reduction of the original image printed on the printed matter. The magnification designation icon 110B may accept the magnification by the number of touch operations by the user. The magnification designation icon 110B may accept an instruction to display a magnification setting screen for inputting a magnification based on a user's touch operation, and may display the magnification setting screen on the operation panel 30. "100%" displayed on the magnification designation icon 110B in FIG. 3 indicates that the set magnification is 100%. 100% indicates that the magnification is the same as that of the original image.

The paper selection icon 110C accepts settings related to the medium to be fed to the printing unit 20 when printing or copying is performed by the multifunction device 1. The paper selection icon 110C may accept the selection of a paper feed source by the number of touch operations by the user. The paper selection icon 110C may accept an instruction to display a paper setting screen for selecting a paper feed source based on a user's touch operation, and may display the paper setting screen on the operation panel 30. The paper feed source includes an automatic selection to be determined by the control unit 50 based on the document at the time of copying or the print data at the time of printing.

"Auto" displayed on the paper selection icon 110C in FIG. 3 indicates that the automatic selection of the paper feed source is selected.

The color setting icon 110D accepts settings related to the color of the printed matter to be printed when printing or copying is performed on the multifunction device 1. The color setting icon 110D displays "automatic color selection", "full color", "black and white", "gray", "two colors", and "others". When any of "automatic color selection", "full color", "black and white", "gray", "two colors", and "others" is selected by the user's touch operation, the color setting icon 110D accepts an instruction related to the color of the printed matter. For example, when "black and white" is selected, the printing unit 20 generates a printed matter of a black and white image. When "automatic color selection" is selected, the control unit 50 selects any color printing, black-and-white printing, and two-color printing based on the document or print data, and causes the printing unit 20 to execute the selected printing.

The printed matter designation icon 110E accepts settings related to the process of the printed matter to be printed when printing or copying is performed by the multifunction device 1 or the operation of the reading unit 10. The printed matter designation icon 110E displays "document setting", "finishing", "editing", and "double-sides". When any one of "document setting", "finishing", "editing", and "double-sided" is selected by a user's touch operation, the operation panel 30 displays various setting screens. The various setting screens display the icon 110. When "document setting" is selected, the operation panel 30 displays a document setting screen. When "finishing" is selected, the operation panel 30 displays a finishing setting screen. When "editing" is selected, the operation panel 30 displays an edit setting screen. When "double-sided" is selected, the operation panel 30 displays a double-sided setting screen. The printed matter designation icon 110E is a folder icon that displays the icon 110 in a lower hierarchy when a user's touch operation is performed.

The start instruction icon 120 accepts instructions to execute various functions of the multifunction device 1. When the start instruction icon 120 accepts a user's touch operation, the operation panel 30 transmits an execution instruction to the control unit 50. Upon receiving the execution instruction, the control unit 50 controls the operations of one or more units of the reading unit 10, the printing unit 20, and the communication interface 60 based on the execution instruction.

Figure 4:
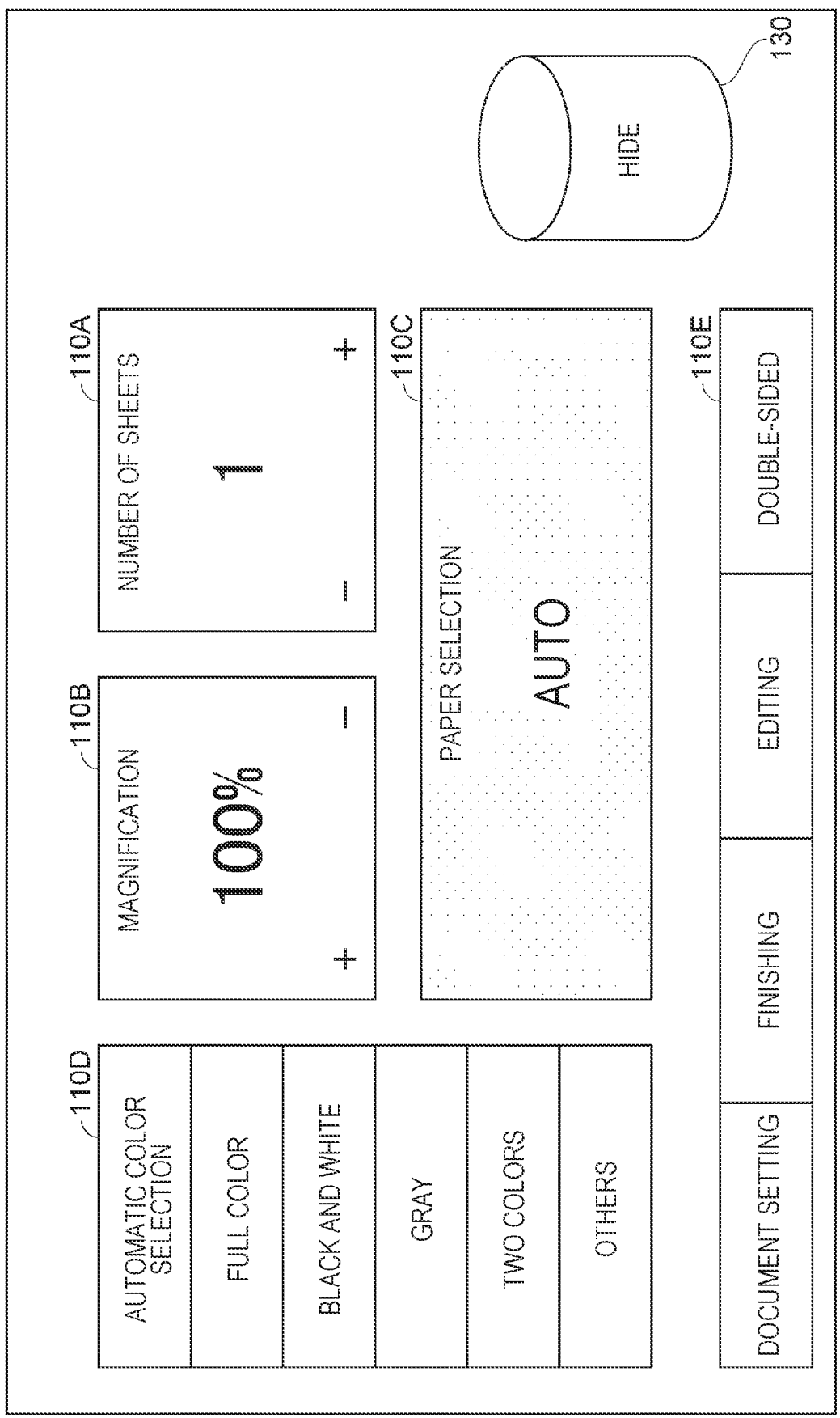
FIG. 4 is a diagram showing an edit screen displayed on the operation panel.

FIG. 4 shows an edit screen 105 displayed on the operation panel 30.

The edit screen 105 is a screen that accepts a user's touch operation and edits an image displayed on the display 31 of the operation panel 30. The image to be edited is an icon 110, a background image of the operation screen 100, and various images displayed on the operation screen 100. Editing the image includes switching between display/hide, transforming the image, changing the color, deleting the image, changing the size, changing the image position, and the like.

The operation panel 30 switches from the operation screen 100 to the edit screen 105 under the control of the display control unit 51. The edit screen 105 accepts an edit instruction of the icon 110. The edit screen 105 displays the number-of-sheets designation icon 110A, the magnification designation icon 110B, the paper selection icon 110C, the color setting icon 110D, and the printed matter designation icon 110E similar to the operation screen 100. The edit screen 105 displays a hide setting icon 130 instead of the start instruction icon 120. The hide setting icon 130 is an example of an icon for indicating a hidden area, but for example, a trash can icon may be displayed. The start instruction icon 120 is not displayed on the edit screen 105 and cannot be edited. The start instruction icon 120 is not subject to editing.

The hide setting icon 130 sets the icon 110 to be hidden. Among the plurality of icons 110 displayed on the edit screen 105, when the hide setting icon 130 is dropped by the user's touch operation on the selected icon 110, the selected icon 110 is set to be hidden. The hide setting icon 130 is not displayed on the operation screen 100. The hide setting icon 130 is displayed on the edit screen 105, but cannot be edited. The hide setting icon 130 is not subject to editing.

The edit instruction accepted on the edit screen 105 is a command such as a selection instruction, a movement instruction, a hide instruction, and a size change instruction.

The selection instruction is output as a user's touch operation based on a tap operation to the icon 110. The selection instruction is an instruction indicating the selection of the icon 110 to be edited.

The movement instruction is output as a user's touch operation based on a slide operation or a drag operation to the selected icon 110. The movement instruction is an instruction to instruct the movement of the selected icon 110.

The hide instruction is output as a user's touch operation when the selected icon 110 is dropped on the hide setting icon 130 by a drag and drop operation. The hide instruction is an instruction to set the selected icon 110 to be hidden. The state at the time of operation will be described later.

The size change instruction is output as a user's touch operation based on a pinch-in operation or a pinch-out operation of the selected icon 110. The size change instruction is an instruction to instruct the enlargement or reduction of the selected icon 110.

First Embodiment

FIG. 4 shows the edit screen 105 of the first embodiment.

The operation panel 30 displays, on the edit screen 105, the number-of-sheets designation icon 110A, the magnification designation icon 110B, the color setting icon 110D, and the printed matter designation icon 110E in the same display mode. On the other hand, the operation panel 30 displays, on the edit screen 105, the paper selection icon 110C in a display mode different from that of the number-of-sheets designation icon 110A, the magnification designation icon 110B, the color setting icon 110D, and the printed matter designation icon 110E. In FIG. 4, the fill pattern of the paper selection icon 110C is different from the fill pattern of the other icons 110. The display mode is not limited to the fill pattern, and may be a color.

The number-of-sheets designation icon 110A, the magnification designation icon 110B, the paper selection icon 110C, the color setting icon 110D, the printed matter designation icon 110E, and the start instruction icon 120 shown in FIG. 3 are stored in advance in the memory 40 shown in FIG. 2 with the settings when the edit instruction is accepted.

The start instruction icon 120 does not accept the edit instruction and cannot be thus edited.

The memory 40 stores settings corresponding to various instructions for each of the number-of-sheets designation icon 110A, the magnification designation icon 110B, the color setting icon 110D, and the printed matter designation icon 110E. The selection setting is a setting for accepting a selection instruction and being selected. The movement setting is a setting for accepting a movement instruction and moving. The hide setting is a setting for accepting a hide instruction and hiding the icon. The size change setting is a setting for accepting a size change instruction and resizing. These settings are stored in advance in association with the type of the icon 110. The setting for accepting the hide instruction and hiding the icon corresponds to an example of a first setting.

The memory 40 stores settings corresponding to various instructions for the paper selection icon 110C. The selection setting is a setting for accepting a selection instruction and being selected. The movement setting is a setting for accepting a movement instruction and moving. The hide setting is a setting for accepting a hide instruction and maintaining the display. The size change setting is a setting for accepting a size change instruction and resizing. These settings are stored in advance in association with the type of the icon 110. The setting for accepting the hide instruction and maintaining the display corresponds to an example of a second setting.

The operation panel 30 displays the operation screen 100 of FIG. 3 to the edit screen 105 of FIG. 4 in a switchable manner under the control of the display control unit 51. The edit screen 105 is displayed when the screen displayed on the operation panel 30 is switched.

As shown in FIG. 4, the operation panel 30 makes the display mode of the paper selection icon 110C different from that of the number-of-sheets designation icon 110A, the magnification designation icon 110B, the color setting icon 110D, and the printed matter designation icon 110E. The paper selection icon 110C has a different display mode when it is displayed on the operation screen 100 and when it is displayed on the edit screen 105. The display mode may be a color or a pattern. The number-of-sheets designation icon 110A, the magnification designation icon 110B, the color setting icon 110D, and the printed matter designation icon 110E have a setting of accepting a hide instruction and hiding the icon. The paper selection icon 110C has a setting for accepting a hide instruction and maintaining the display.

By visually recognizing the edit screen 105 shown in FIG. 4, the user can confirm that the paper selection icon 110C has different properties from the other icons 110.

Figure 5:
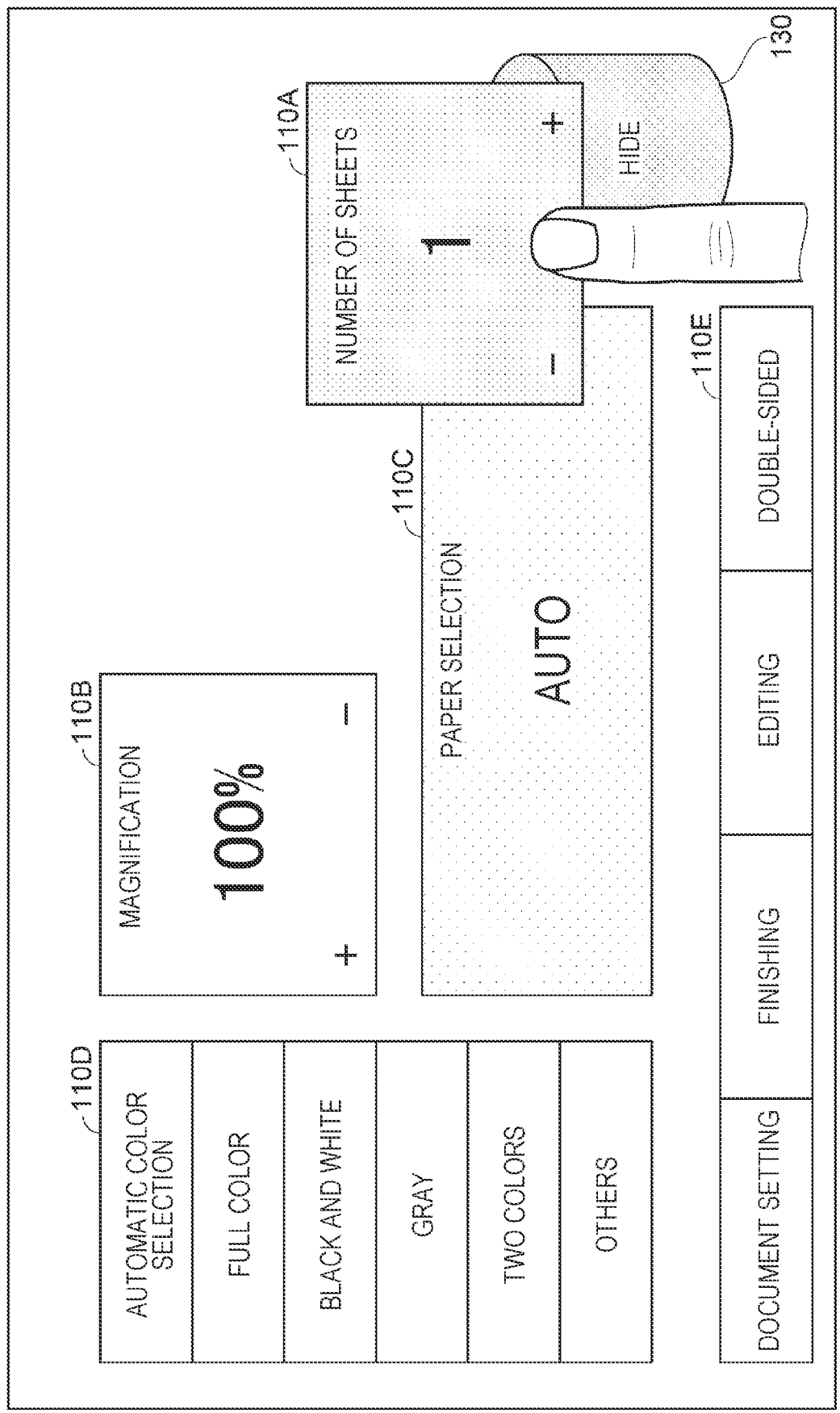
FIG. 5 is a diagram showing a state in which a user is performing an operation of hiding an icon of 1.

FIG. 5 shows a state in which the user is performing an operation of hiding the icon 110 of 1.

FIG. 5 shows a state in which the number-of-sheets designation icon 110A is selected by a user's touch operation and moved by a drag operation, and the number-of-sheets designation icon 110A and the hide setting icon 130 are superimposed. When the user performs a drop operation in the state in which the number-of-sheets designation icon 110A and the hide setting icon 130 are superimposed, the number-of-sheets designation icon 110A is set to be hidden.

Figure 6:
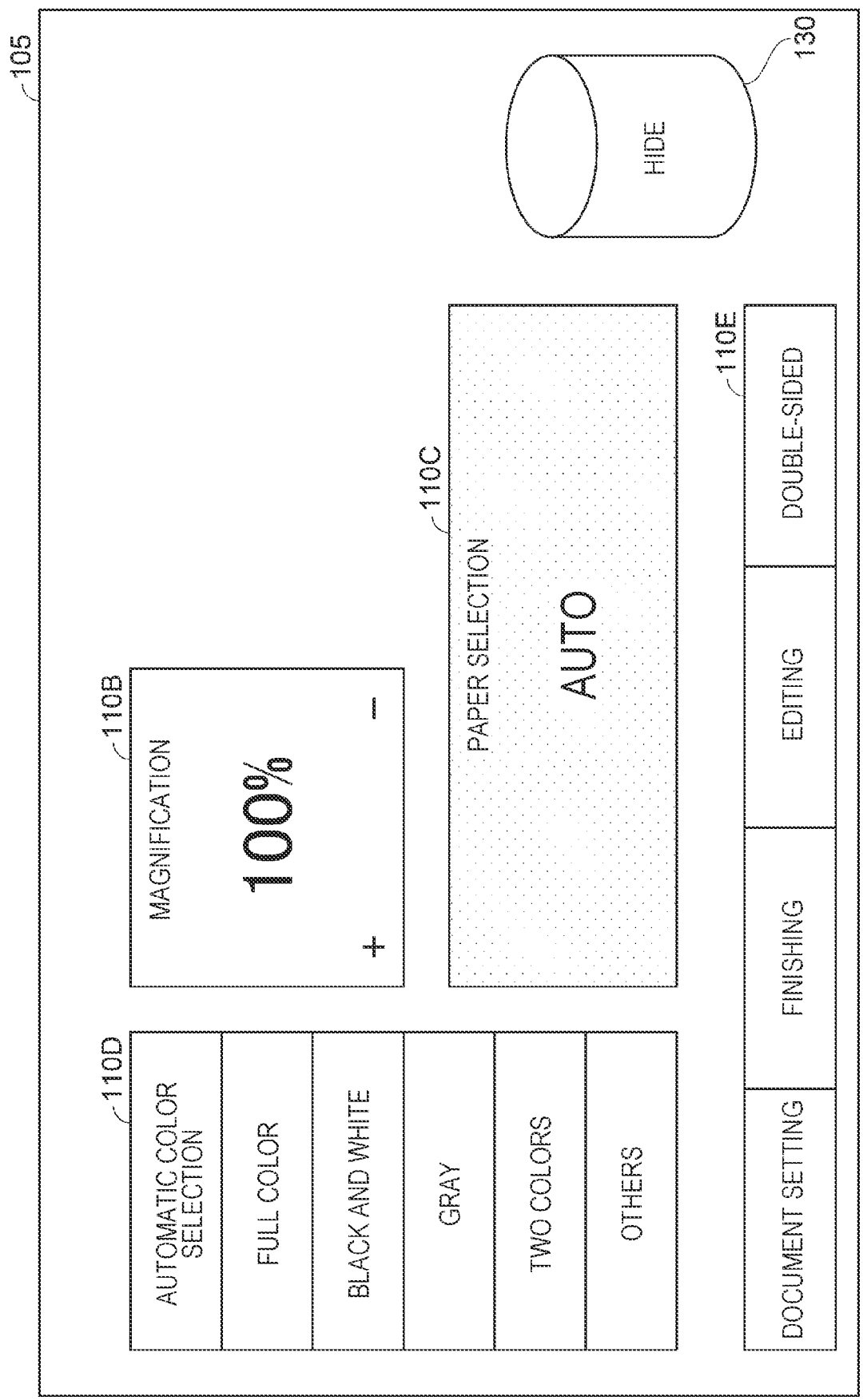
FIG. 6 is a diagram showing the result of the user setting for hiding the icon of 1.

FIG. 6 shows the result of the user setting for hiding the icon 110 of 1.

FIG. 6 shows an edit screen 105 when the number-of-sheets designation icon 110A is set to be hidden. When the number-of-sheets designation icon 110A is set to be hidden, the number-of-sheets designation icon 110A is hidden on the edit screen 105. The display control unit 51 hides the icon 110 set to be hidden on the edit screen 105, so that the user can confirm the arrangement state of the icon 110 being edited.

When the display control unit 51 switches from the edit screen 105 to the operation screen 100 in the state of the edit screen 105 of FIG. 6, the operation panel 30 displays the operation screen 100 in which the hide setting icon 130 is changed to the start instruction icon 120. The displayed operation screen 100 does not display the number-of-sheets designation icon 110A. The operation screen 100 maintains the state edited on the edit screen 105.

Figure 7:
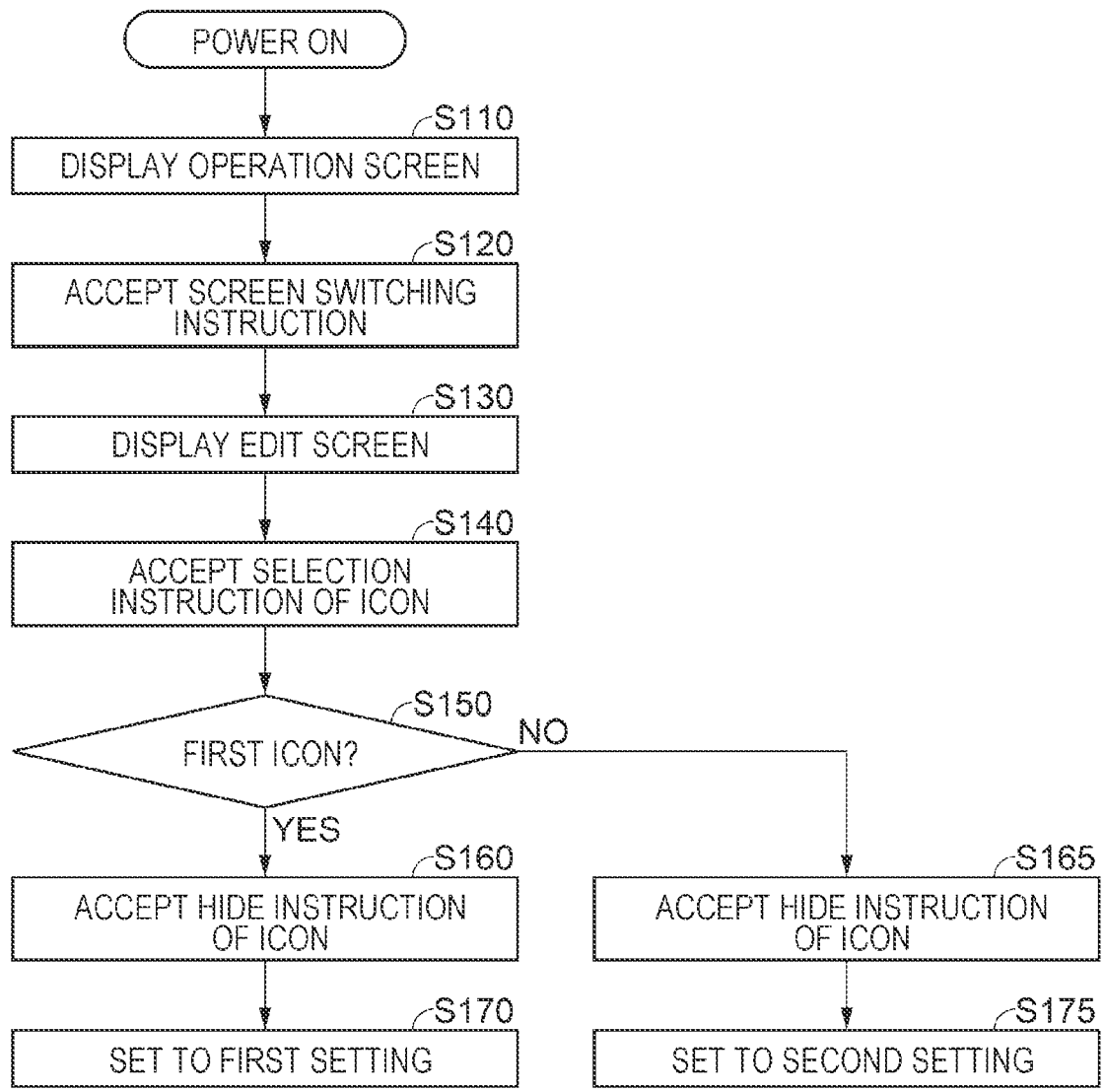
FIG. 7 is a diagram showing a flowchart of an editing operation.

FIG. 7 shows a flowchart of the editing operation.

A display control method of the multifunction device 1 according to an editing operation of FIG. 7 is performed by the processor 27 of the display control unit 51 reading the display control program 45 from the memory 40 and executing the display control program 45.

When the user turns on the power of the multifunction device 1, the display control unit 51 displays the operation screen 100 on the operation panel 30, as shown in step S110 of FIG. 7. The timing at which the operation panel 30 displays the operation screen 100 is not limited to when the power is turned on. When the multifunction device 1 is provided with the power saving mode, the operation panel 30 may display the operation screen 100 at the timing when the power saving mode is switched to the normal mode.

In a state in which the operation panel 30 displays the operation screen 100, the multifunction device 1 accepts a screen switching instruction by the user as shown in step S120. The screen switching instruction is a command instructing that the operation screen 100 displayed on the operation panel 30 is switched to the edit screen 105 under the control of the display control unit 51. The multifunction device 1 accepts the screen switching instruction by a touch operation of the user on the operation panel 30. An example of the touch operation is a long-press touch operation on the operation screen 100 by the user. Acceptance of the screen switching instruction is not limited to touch operations on the operation panel 30. When the multifunction device 1 is provided with a screen switching instruction button and the user operates the screen switching instruction button, the multifunction device 1 may accept the screen switching instruction.

As shown in step S130, the display control unit 51 switches the operation screen 100 displayed on the operation panel 30 to the edit screen 105 when the screen switching instruction is accepted. The operation panel 30 displays the edit screen 105. As shown in FIG. 4, the displayed edit screen 105 displays the number-of-sheets designation icon 110A, the magnification designation icon 110B, the color setting icon 110D, and the printed matter designation icon 110E in the same display mode. On the other hand, the edit screen 105 displays the paper selection icon 110C in a display mode different from that of the number-of-sheets designation icon 110A, the magnification designation icon 110B, the color setting icon 110D, and the printed matter designation icon 110E.

The operation panel 30 accepts a user's touch operation in a state in which the edit screen 105 is displayed. The display control unit 51 accepts a selection instruction of the icon 110 as shown in step S140 based on the user's touch operation.

As shown in step S150, the display control unit 51 determines whether or not the icon 110 for which the selection instruction has accepted is the first icon. The first icon is the icon 110 that includes the first setting. In step S150, the display control unit 51 determines whether the setting of the icon 110 for which the selection instruction has accepted includes the setting for accepting the hide instruction and hiding the icon 110 or the setting for accepting the hide instruction and maintaining the display. The setting for accepting the hide instruction and maintaining the display is the second setting. The icon 110 including the second setting is the second icon. When the setting of the icon 110 for which the selection instruction has accepted includes the first setting, the display control unit 51 determines that the icon 110 for which the selection instruction has accepted is the first icon, and proceeds to step S160. When the setting of the icon 110 for which the selection instruction has accepted includes the second setting, the display control unit 51 determines that the icon 110 for which the selection instruction has accepted is the second icon, and proceeds to step S165.

Among the icons 110 displayed on the edit screen 105 shown in FIG. 4, when the display control unit 51 accepts a selection instruction for any one of the number-of-sheets designation icon 110A, the magnification designation icon 110B, the color setting icon 110D, and the printed matter designation icon 110E, the display control unit 51 determines that the icon is the first icon. When the display control unit 51 accepts the selection instruction for the paper selection icon 110C, the display control unit 51 determines that the icon is not the first icon but the second icon.

In step S160 shown in FIG. 7, the display control unit 51 accepts a hide instruction of the icon 110 for which the selection instruction has accepted. In step S170, the display control unit 51 performs a process based on the setting for the icon 110 for which the hide instruction has accepted. The icon 110 for which the hide instruction has accepted is the first icon, and includes a setting for accepting the hide instruction and hiding the icon 110. The display control unit 51 performs a process of hiding the first icon.

In step S165, the display control unit 51 accepts a hide instruction of the icon 110 for which the selection instruction has accepted. In step S175, the display control unit 51 performs a process based on the setting for the icon 110 for which the hide instruction has accepted. The icon 110 for which the hide instruction has accepted is the second icon, and includes a setting for maintaining the display. The display control unit 51 performs a process of maintaining the display of the second icon.

Second Embodiment

Figure 8:
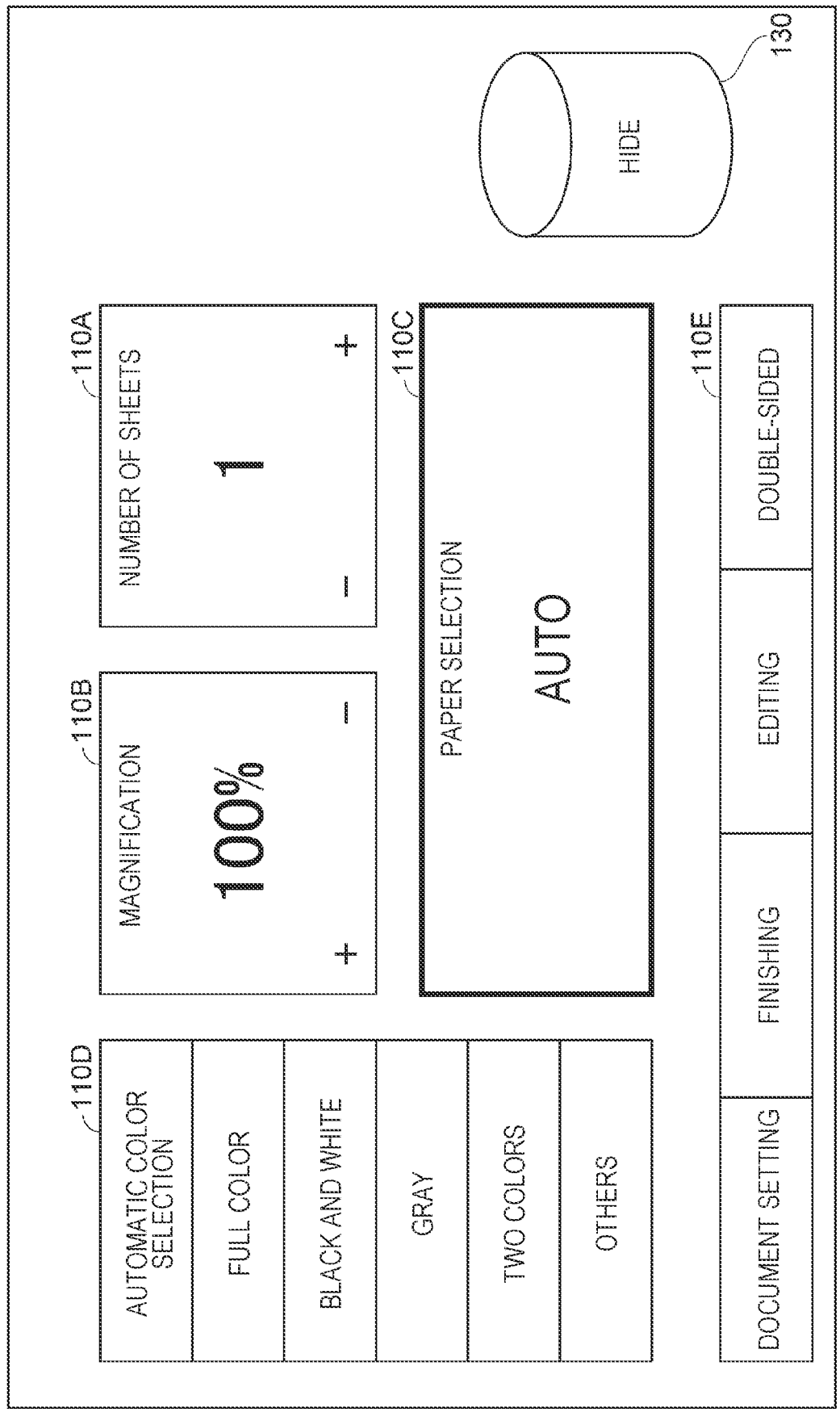
FIG. 8 is a diagram showing an edit screen displayed on the operation panel.

FIG. 8 shows the edit screen 105 of a second embodiment. The edit screen 105 is displayed on the operation panel 30. In the second embodiment, the same configuration as in the first embodiment is denoted by the same reference numerals as those in the first embodiment, and detailed description thereof will be omitted.

Similar to the first embodiment, the memory 40 stores settings corresponding to various instructions for each of the number-of-sheets designation icon 110A, the magnification designation icon 110B, the color setting icon 110D, and the printed matter designation icon 110E. The selection setting is a setting for accepting a selection instruction and being selected. The movement setting is a setting for accepting a movement instruction and moving. The hide setting is a setting for accepting a hide instruction and hiding the icon. The size change setting is a setting for accepting a size change instruction and resizing. These settings are stored in advance in association with the type of the icon 110. The setting for accepting the hide instruction and hiding the icon corresponds to an example of a first setting.

The memory 40 stores settings corresponding to various instructions for the paper selection icon 110C. The selection setting is a setting for accepting a selection instruction and being selected. The movement setting is a setting for accepting a movement instruction and moving. The hide setting is a setting for accepting a hide instruction and maintaining the display. The size change setting is a setting for accepting a size change instruction and resizing. These settings are stored in advance in association with the type of the icon 110. The setting for accepting the hide instruction and maintaining the display corresponds to an example of a second setting.

The operation panel 30 displays, on the edit screen 105, the number-of-sheets designation icon 110A, the magnification designation icon 110B, the color setting icon 110D, and the printed matter designation icon 110E in the same display mode. On the other hand, the operation panel 30 displays, on the edit screen 105, the paper selection icon 110C in a display mode different from that of the number-of-sheets designation icon 110A, the magnification designation icon 110B, the color setting icon 110D, and the printed matter designation icon 110E. In FIG. 8, the width of the border of the paper selection icon 110C is different from the width of the border of the other icons 110. The display mode is not limited to the width of the border, and the color of the border, the color of the icon itself, or the background color of the icon may be changed.

As shown in FIG. 8, the operation panel 30 makes the display mode of the paper selection icon 110C, which includes a setting for accepting a hide instruction and maintaining the display, different from that of the number-of-sheets designation icon 110A, the magnification designation icon 110B, the color setting icon 110D, and the printed matter designation icon 110E, which include a setting for accepting a hide instruction and hiding the icon.

By visually recognizing the edit screen 105 shown in FIG. 8, the user can confirm that the paper selection icon 110C includes settings different from the other icons 110.

Third Embodiment

Figure 9:
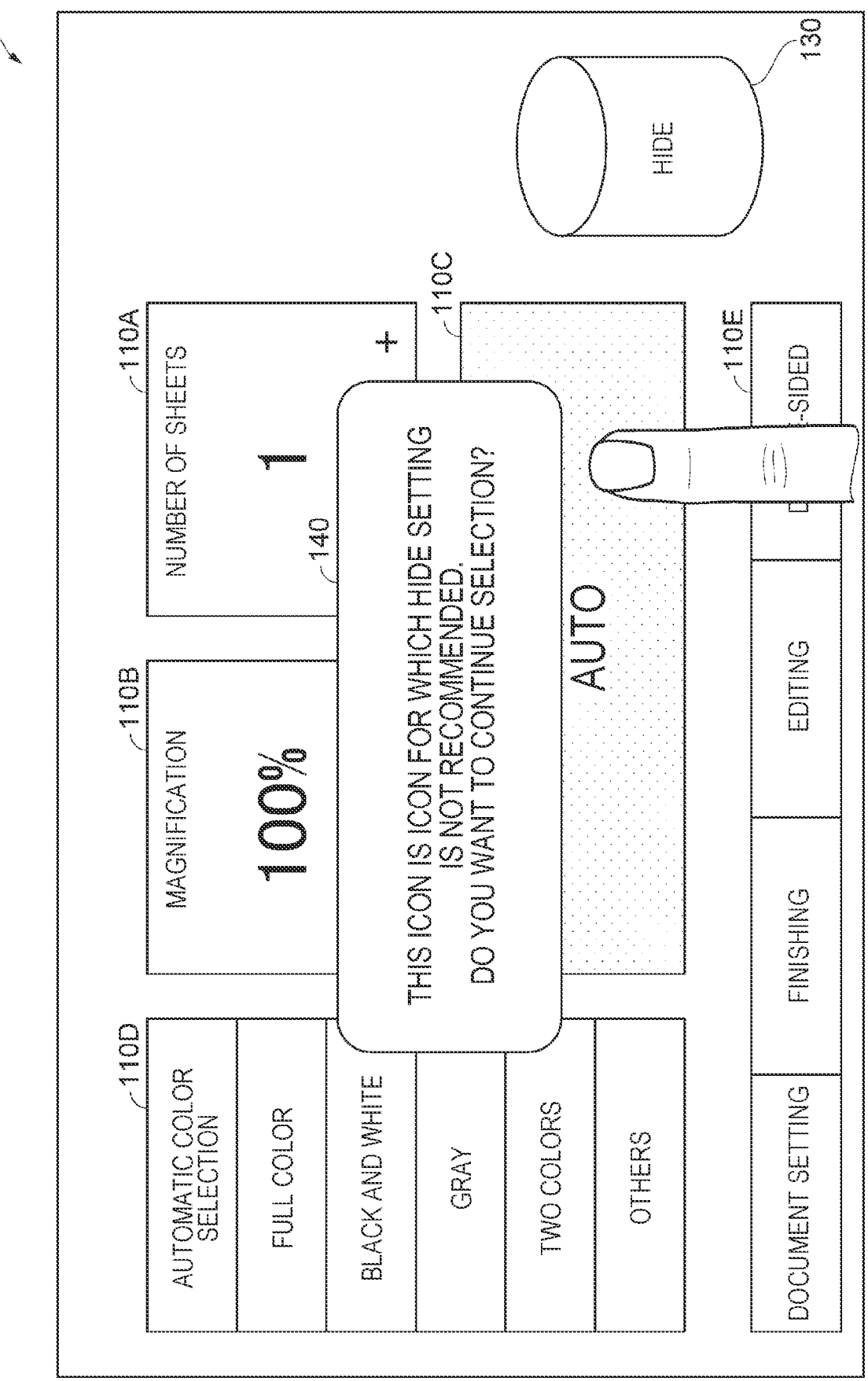
FIG. 9 is a diagram showing a message as a notification.

FIG. 9 displays the message 140 as a notification. FIG. 9 shows a state when the user selects the paper selection icon 110C by a touch operation while the edit screen 105 shown in FIG. 4 is displayed on the operation panel 30. In a third embodiment, the same configuration as in the first embodiment is denoted by the same reference numerals as those in the first embodiment, and detailed description thereof will be omitted.

The memory 40 stores settings corresponding to various instructions for each of the number-of-sheets designation icon 110A, the magnification designation icon 110B, the color setting icon 110D, and the printed matter designation icon 110E. The selection setting is a setting for accepting a selection instruction and being selected. The movement setting is a setting for accepting a movement instruction and moving. The hide setting is a setting for accepting a hide instruction and hiding the icon. The size change setting is a setting for accepting a size change instruction and resizing. These settings are stored in advance in association with the type of the icon 110. The setting for accepting the hide instruction and hiding the icon corresponds to an example of a first setting.

The memory 40 stores settings corresponding to various instructions for the paper selection icon 110C. The selection setting is a setting for accepting a selection instruction and being selected. The movement setting is a setting for accepting a movement instruction and moving. The hide setting is a setting for accepting a hide instruction and giving a notification to hide the icon. The size change setting is a setting for accepting a size change instruction and resizing. These settings are stored in advance in association with the type of the icon 110. The setting for accepting the hide instruction and giving a notification to hide the icon corresponds to an example of a second setting.

When the user selects the paper selection icon 110C by a touch operation, the operation panel 30 displays the message 140. The paper selection icon 110C has a setting for accepting a hide instruction in advance and giving a notification to hide the paper selection icon 110C. The message 140 is, for example, "This icon is an icon for which the hide setting is not recommended. Do you want to continue the selection?".

By visually recognizing the displayed message 140, the user can reconfirm whether or not the paper selection icon 110C may be hidden. After displaying the message 140, the display control unit 51 hides the paper selection icon 110C when the user performs a touch operation to hide the paper selection icon 110C.

FIG. 9 illustrates the message 140 as a notification, but the present disclosure is not limited to the message 140. When the multifunction device 1 includes a voice output unit, voice notification may be used. The content of the message 140 is also not limited to the description in FIG. 9. It is sufficient that the content of the message 140 is any content indicating that the setting is different from the setting for hiding the icon.

Fourth Embodiment

Figure 10:
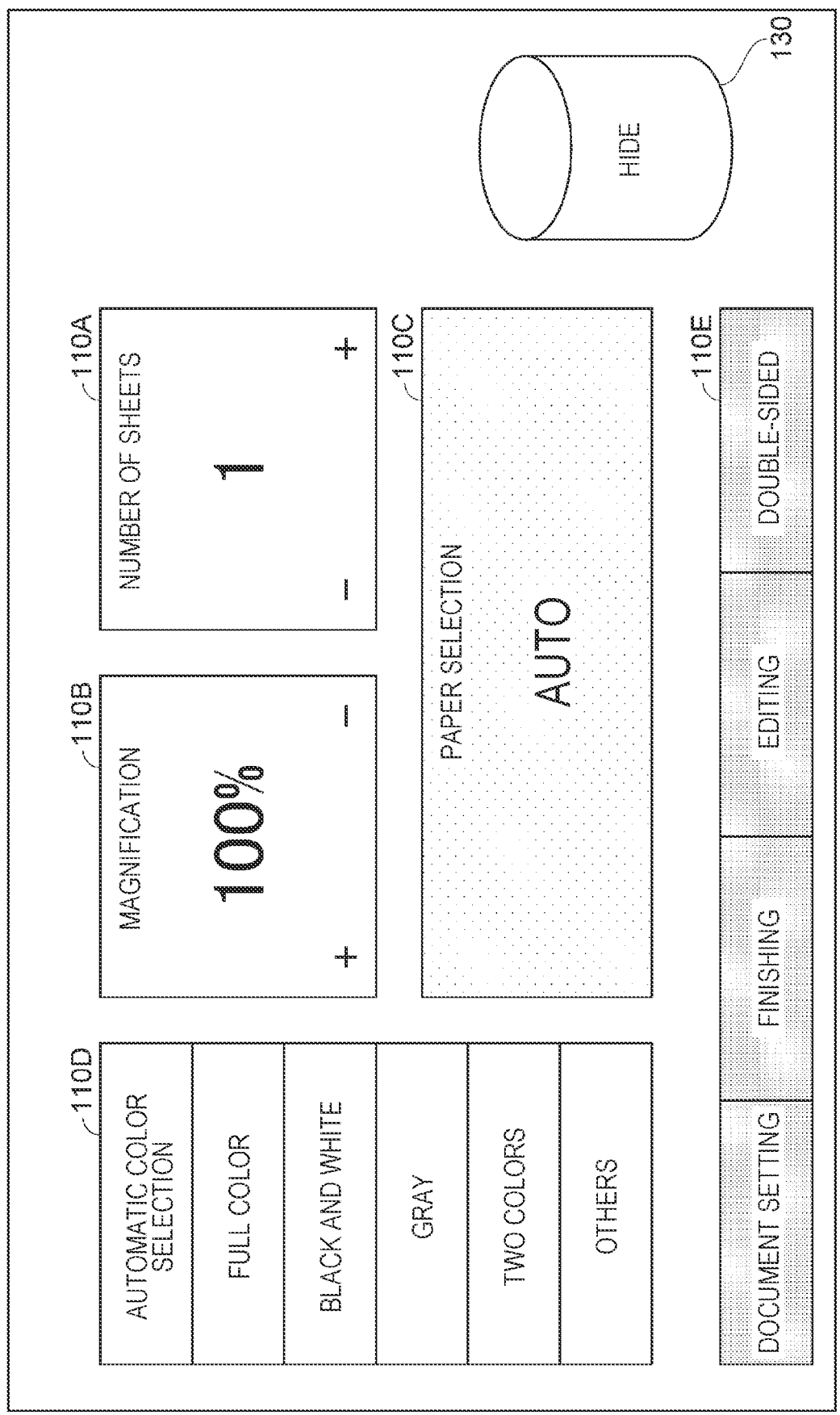
FIG. 10 is a diagram showing the edit screen displayed on the operation panel.

FIG. 10 shows the edit screen 105 of a fourth embodiment. The edit screen 105 is displayed on the operation panel 30. The edit screen 105 of FIG. 10 is a screen when the operation screen 100 is switched to the edit screen 105 under the control of the display control unit 51. In the fourth embodiment, the same configurations as those in the first embodiment are denoted by the same reference numerals as those in the first embodiment, and detailed description thereof will be omitted.

The memory 40 stores settings corresponding to various instructions for each of the number-of-sheets designation icon 110A, the magnification designation icon 110B, and the color setting icon 110D. The selection setting is a setting for accepting a selection instruction and being selected. The movement setting is a setting for accepting a movement instruction and moving. The hide setting is a setting for accepting a hide instruction and hiding the icon. The size change setting is a setting for accepting a size change instruction and resizing. These settings are stored in advance in association with the type of the icon 110. The setting for accepting the hide instruction and hiding the icon corresponds to an example of a first setting.

The memory 40 stores settings corresponding to various instructions for the paper selection icon 110C. The selection setting is a setting for accepting a selection instruction and being selected. The movement setting is a setting for accepting a movement instruction and moving. The hide setting is a setting for accepting a hide instruction and maintaining the display. The size change setting is a setting for accepting a size change instruction and resizing. These settings are stored in advance in association with the type of the icon 110. The setting for accepting the hide instruction and maintaining the display corresponds to an example of a second setting.

The memory 40 stores settings corresponding to various instructions for the printed matter designation icon 110E. The selection setting is a setting for accepting a selection instruction and being selected. The lower hierarchy display setting is a setting for accepting a lower hierarchy display instruction and displaying an icon in a lower hierarchy. The movement setting is a setting for accepting a movement instruction and moving. The hide setting is a setting for accepting a hide instruction and hiding the icon. The size change setting is a setting for accepting a size change instruction and resizing. These settings are stored in advance in association with the type of the icon 110. When the user gives a lower hierarchy display instruction to any of "document setting", "finishing", "editing", and "double-sided" displayed on the printed matter designation icon 110E, the operation panel 30 displays an icon in a lower hierarchy. The user's touch operation corresponding to the lower hierarchy display instruction may be the same as or different from the operation corresponding to the selection instruction. When the touch operation corresponding to the lower hierarchy display instruction and the touch operation corresponding to the selection instruction are the same, the display control unit 51 determines whether the instruction is the selection instruction or the display instruction depending on the touch position.

Figure 11:
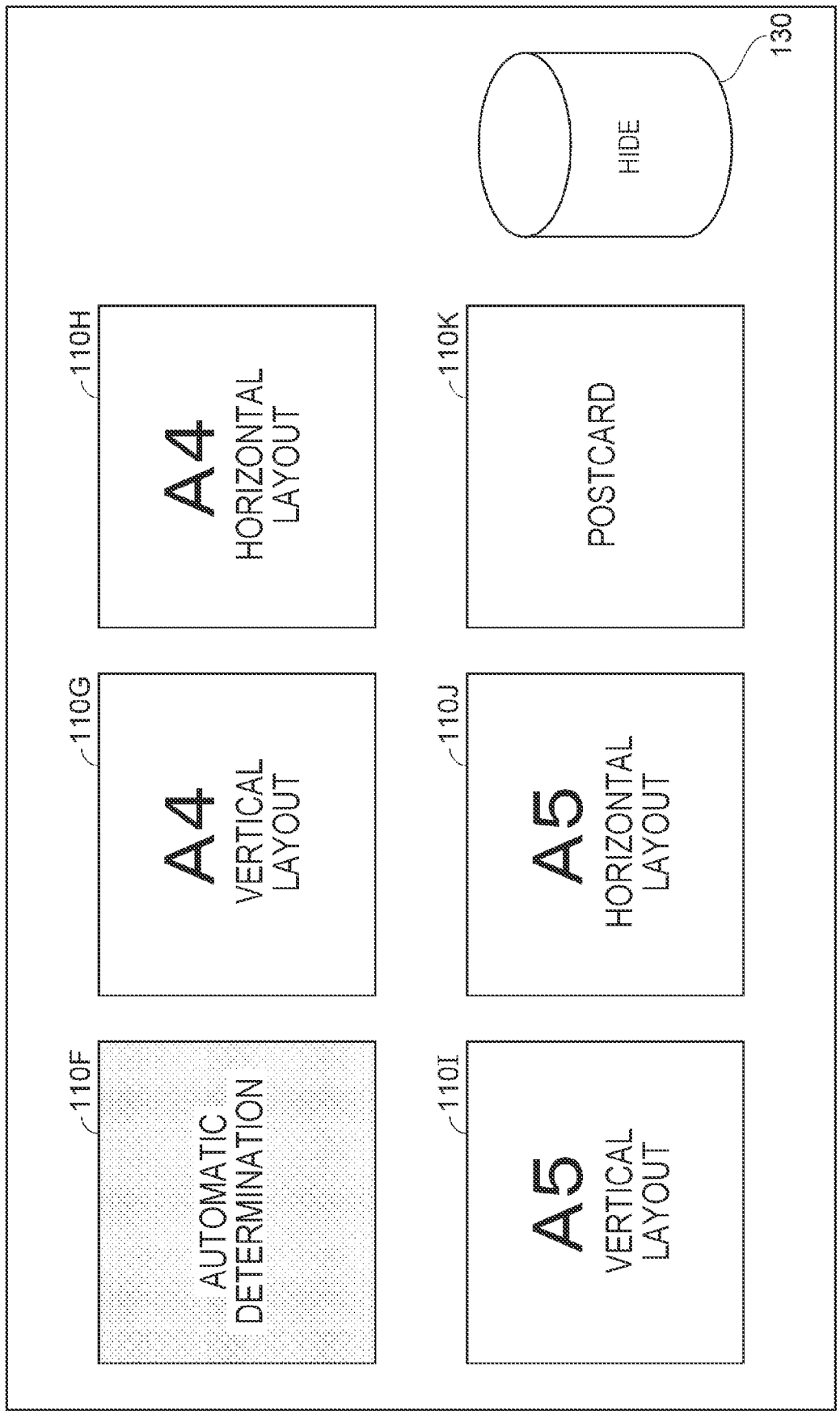
FIG. 11 is a diagram showing a state in which icons in a lower hierarchy are displayed.

FIG. 11 shows a state in which icons in the lower hierarchy are displayed.

FIG. 11 is a lower hierarchy edit screen 107 to be displayed when the user gives a lower hierarchy display instruction to the "document setting" of the printed matter designation icon 110E. When the operation panel 30 displays the lower hierarchy edit screen 107, the user can edit the icon 110 displayed on the lower hierarchy edit screen 107. The lower hierarchy edit screen 107 displays an automatic determination icon 110F, an A4 vertical layout designation icon 110G, an A4 horizontal layout designation icon 110H, an A5 vertical layout designation icon 110I, an A5 horizontal layout designation icon 110J, a postcard designation icon 110K, and the hide setting icon 130.

The memory 40 stores settings corresponding to various instructions for each of the A4 vertical layout designation icon 110G, the A4 horizontal layout designation icon 110H, the A5 vertical layout designation icon 110I, the A5 horizontal layout designation icon 110J, and the postcard designation icon 110K. The selection setting is a setting for accepting a selection instruction and being selected. The movement setting is a setting for accepting a movement instruction and moving. The hide setting is a setting for accepting a hide instruction and hiding the icon. The size change setting is a setting for accepting a size change instruction and resizing. These settings are stored in advance in association with the type of the icon 110. The setting for accepting the hide instruction and hiding the icon corresponds to an example of a first setting.

The memory 40 stores settings corresponding to various instructions for the automatic determination icon 110F. The selection setting is a setting for accepting a selection instruction and being selected. The movement setting is a setting for accepting a movement instruction and moving. The hide setting is a setting for accepting a hide instruction and maintaining the display. The size change setting is a setting for accepting a size change instruction and resizing. These settings are stored in advance in association with the type of the icon 110. The setting for accepting the hide instruction and maintaining the display corresponds to an example of a second setting.

As shown in FIG. 11, the lower hierarchy edit screen 107 displays the automatic determination icon 110F in a display mode different from that of the A4 vertical layout designation icon 110G, the A4 horizontal layout designation icon 110H, the A5 vertical layout designation icon 110I, the A5 horizontal layout designation icon 110J, and the postcard designation icon 110K.

By visually recognizing the lower hierarchy edit screen 107, the user can confirm that the automatic determination icon 110F has a different setting from the A4 vertical layout designation icon 110G, the A4 horizontal layout designation icon 110H, the A5 vertical layout designation icon 110I, the A5 horizontal layout designation icon 110J, and the postcard designation icon 110K.

Referring back to FIG. 10, the edit screen 105 displays the paper selection icon 110C in a display mode different from that of the number-of-sheets designation icon 110A, the magnification designation icon 110B, and the color setting icon 110D. The operation panel 30 displays the printed matter designation icon 110E in a display mode different from that of the number-of-sheets designation icon 110A, the magnification designation icon 110B, and the color setting icon 110D. The operation panel 30 displays the paper selection icon 110C in a display mode different from that of the printed matter designation icon 110E.

By visually recognizing the edit screen 105 of FIG. 10, the user can confirm that the paper selection icon 110C and the printed matter designation icon 110E have different settings from the number-of-sheets designation icon 110A, the magnification designation icon 110B, and the color setting icon 110D. Further, the user can confirm that the paper selection icon 110C has a different setting from the printed matter designation icon 110E.

Since the user can confirm that the settings of the icons 110 are different, the user can perform editing work according to the settings of the respective icons 110 at the time of editing work.

Fifth Embodiment

Figure 12:
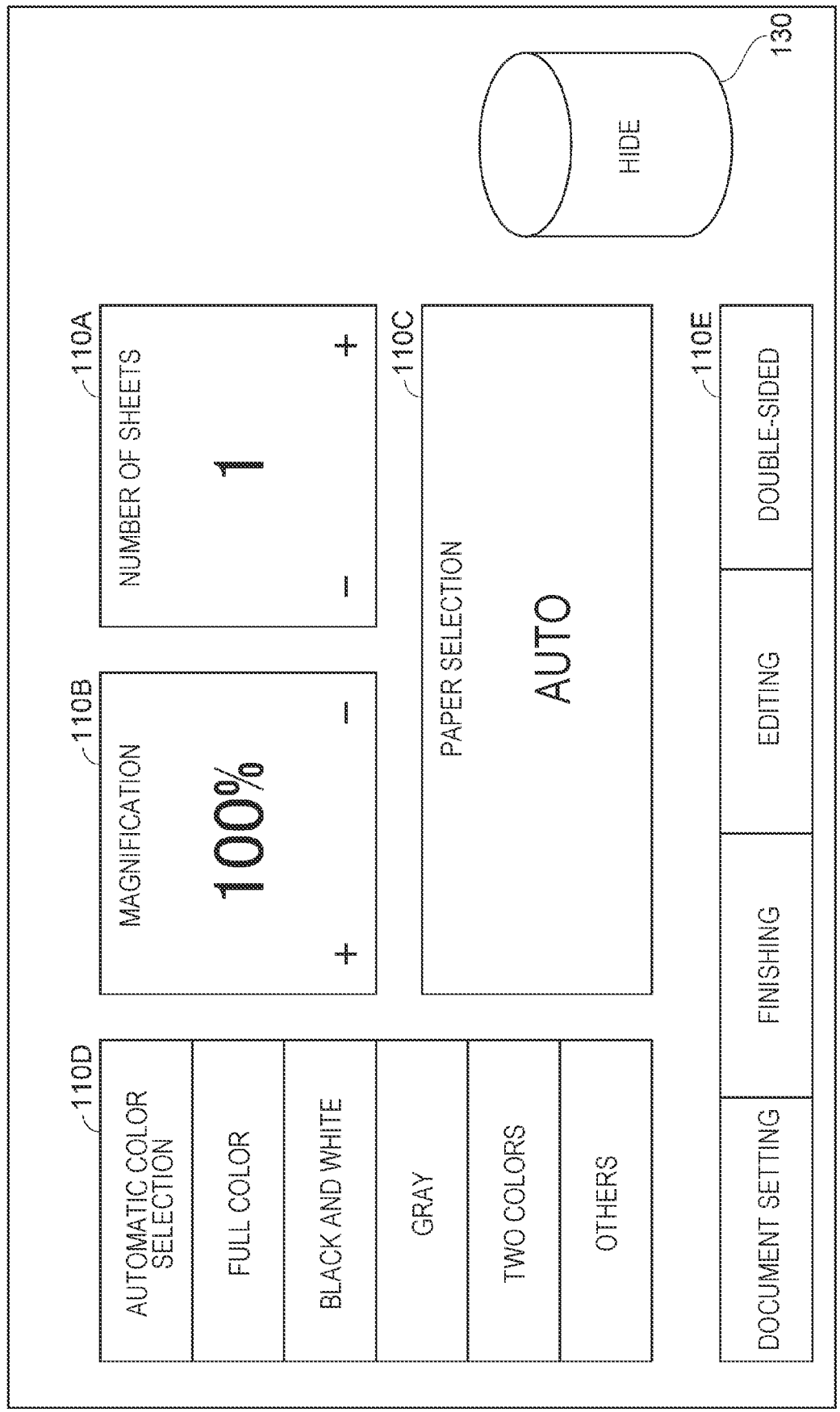
FIG. 12 is a diagram showing the edit screen displayed on the operation panel.

FIG. 12 shows the edit screen 105 of a fifth embodiment. The edit screen 105 is displayed on the operation panel 30. The edit screen 105 of FIG. 12 is a screen when the operation screen 100 is switched to the edit screen 105 under the control of the display control unit 51. At the time when the display control unit 51 switches from the operation screen 100 to the edit screen 105, the display of each icon 110 displayed on the edit screen 105 is the same. The memory 40 stores the same settings as those in the first embodiment for each icon 110.

Figure 13:
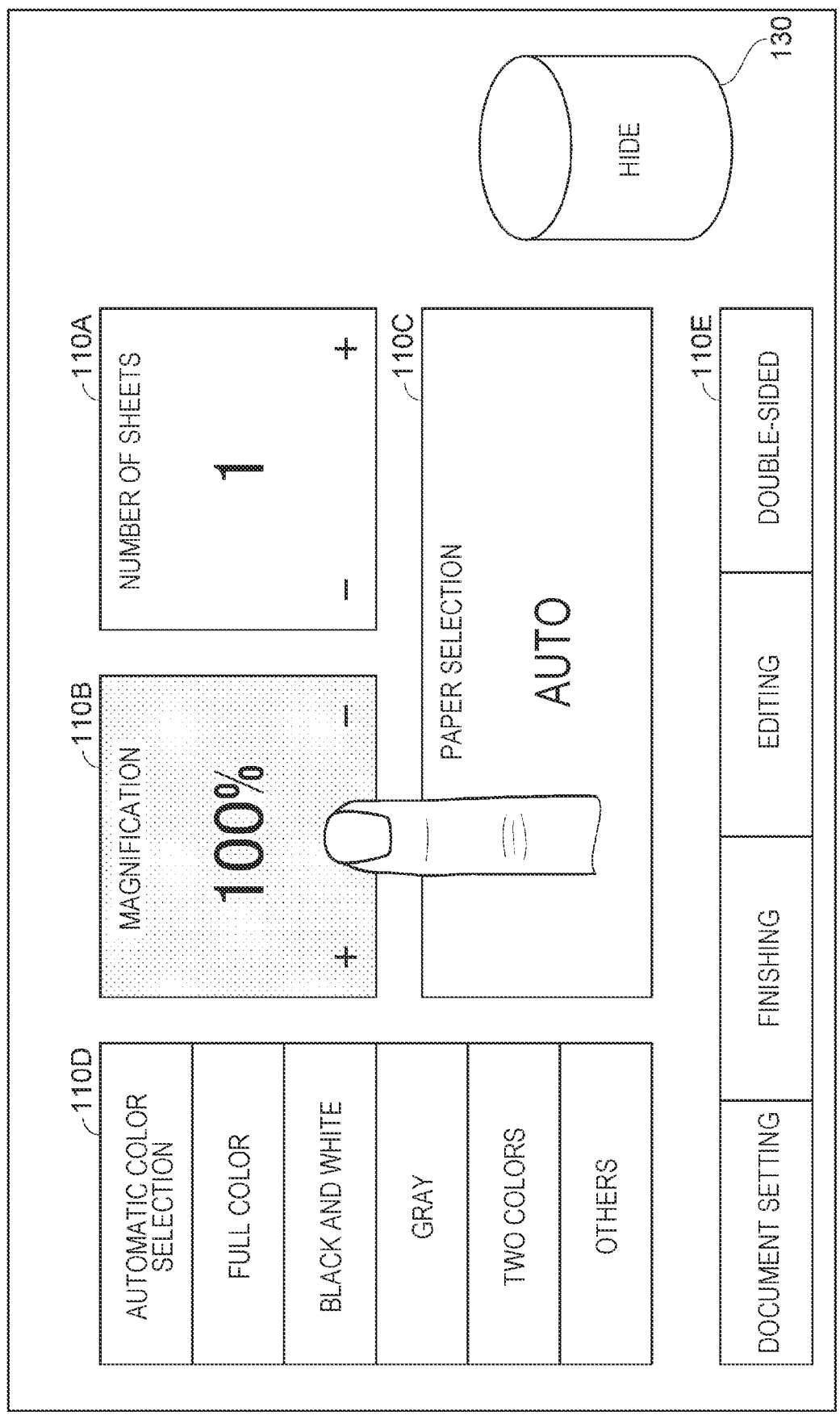
FIG. 13 is a diagram showing a state when the user selects the icon of 1 on the edit screen.

FIG. 13 shows a state when the user selects the icon 110 of 1 on the edit screen 105 of FIG. 12. FIG. 13 shows a state when the user gives a selection instruction to the magnification designation icon 110B by a user's touch operation on the edit screen 105.

When the user gives a selection instruction to the magnification designation icon 110B, the edit screen 105 displays the magnification designation icon 110B in a display mode different from that of the number-of-sheets designation icon 110A, the paper selection icon 110C, the color setting icon 110D, and the printed matter designation icon 110E. The magnification designation icon 110B has a setting for accepting a selection instruction and being selected, and a setting for accepting a hide instruction and hiding the icon. By visually recognizing the edit screen 105 of FIG. 13, the user can determine that the magnification designation icon 110B has accepted the selection instruction.

Figure 14:
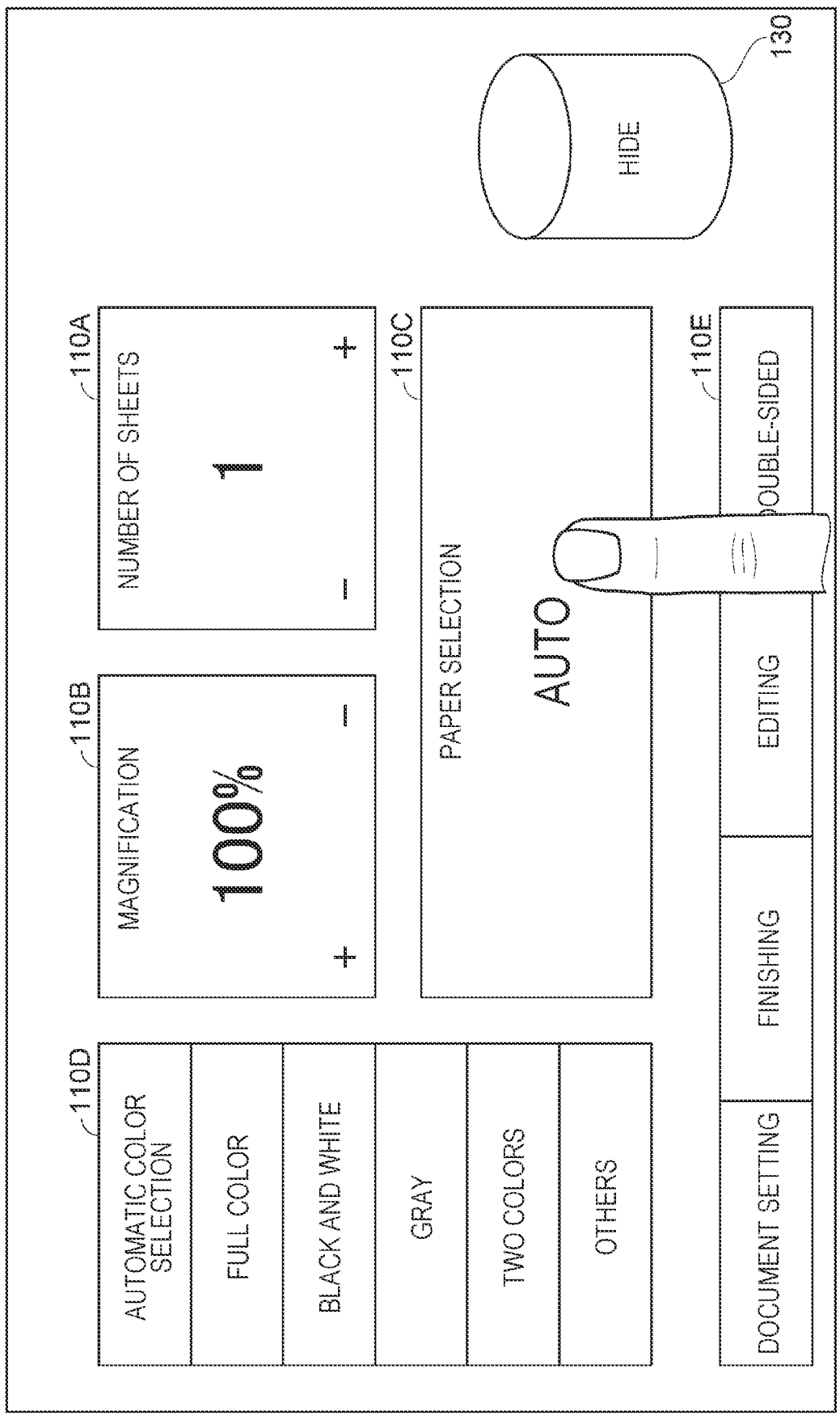
FIG. 14 is a diagram showing a state when the user selects the icon of 1 on the edit screen.

FIG. 14 shows a state when the user selects the icon 110 of 1 on the edit screen 105 of FIG. 12. The icon 110 of 1 selected in FIG. 14 is different from the icon 110 of 1 selected in FIG. 13. FIG. 14 shows a state when the user gives a selection instruction to the paper selection icon 110C by a touch operation on the edit screen 105.

When the user gives a selection instruction to the paper selection icon 110C, the edit screen 105 displays the paper selection icon 110C in the same display mode as the number-of-sheets designation icon 110A, the magnification designation icon 110B, the color setting icon 110D, and the printed matter designation icon 110E. When the user gives a selection instruction to the paper selection icon 110C, the operation panel 30 does not change the display mode of the paper selection icon 110C, unlike the case of FIG. 13. The paper selection icon 110C has a setting for accepting a selection instruction and being selected, and a setting for accepting a hide instruction to maintain the display.

As shown in FIGS. 13 and 14, when the operation panel 30 is displaying the edit screen 105, the user selects the icon 110 of 1. When the user gives a selection instruction to the icon 110, the selected icon 110 has a different display mode between the icon 110 set to be hidden and the icon 110 set to maintain the display. The user can confirm the setting of the selected icon 110 by visually recognizing the display of the icon 110 when the icon 110 of 1 is selected. Since the user can confirm that the settings of the icons 110 are different, the user can perform editing work according to the settings of the respective icons 110 at the time of editing work.

The multifunction device according to the present embodiment includes a reading unit that reads a document, a printing unit that performs printing on a medium, an operation panel that accepts instructions including an execution instruction and an edit instruction from a user and displays an operation screen including a plurality of icons and an edit screen including the plurality of icons, and a display control section that switches the display of the operation panel to the operation screen or the edit screen. When the operation screen is displayed, the operation panel accepts the execution instruction to execute the reading unit or the printing unit by an icon. When the edit screen is displayed, the operation panel accepts the edit instruction including the hide instruction to hide the icon by the icon. The plurality of icons include a first icon set to the first setting by the hide instruction and a second icon set to the second setting by the hide instruction. When displaying the edit screen on the operation panel, the display control section makes the display mode different between the first icon displayed on the edit screen and the second icon displayed on the edit screen.

When the edit screen accepts a hide instruction, the multifunction device displays the icons set to different settings among the plurality of icons in a distinguishable manner. The user can grasp that different settings are made for the hide instruction. By recognizing icons with different settings, the user can reduce the operation of uniformly hiding a plurality of icons.

The first setting when the operation panel accepts the hide instruction is the setting for hiding the icon, and the second setting is the setting for maintaining the display.

When the operation panel accepts the hide instruction, the display control section hides the first icon. The display control section does not hide the second icon when the operation panel accepts the hide instruction, and maintains the display. The multifunction device displays the icon to be hidden when the hide instruction is accepted and the icon to maintain the display in a distinguishable manner. The user can reduce the operation of giving a hide instruction to the icon that maintains the display.

The first setting when the hide instruction is accepted is the setting for hiding the icon, and the second setting is the setting for giving a notification of hiding the icon.

When the operation panel accepts a hide instruction from the user for the second icon, the operation panel notifies the second icon to hide the display. The user can confirm the pros and cons of hiding by receiving the notification.

The display mode is the color of the icon displayed on the edit screen.

The user can determine that the setting of the icon when the hide instruction is provided is different.

The color of the second icon displayed on the operation screen and the color of the second icon displayed on the edit screen are different from each other.

When switching from the operation screen to the edit screen, the user can easily recognize the icons with different settings.

The display mode is the frame color of the icon displayed on the edit screen.

The user can determine that the setting of the icon when the hide instruction is provided is different.

The display mode is the color of the icon displayed when a selection instruction is accepted as an edit instruction by the user on the edit screen.

The user can confirm that the icon settings differ depending on the color displayed when the icon is selected.

A display control method of the multifunction device is a display control method provided in the multifunction device, which accepts instructions including an execution instruction and an edit instruction from a user and displays an operation screen and an edit screen. A plurality of icons include a first icon set to a first setting by a hide instruction included in an edit instruction and a second icon set to a second setting by the hide instruction. The multifunction device switches the display from the operation screen that accepts the execution instruction to execute a reading unit or a printing unit with the icon to the edit screen that accepts the edit instruction with the icon. When the edit screen is displayed, the multifunction device displays the first icon and the second icon in different display modes.

The user can grasp the icons that have different settings for the hide instructions. By recognizing icons with different settings, the user can reduce the operation of uniformly hiding a plurality of icons.

A display control program is executed by a processor of a multifunction device including an operation panel that displays a plurality of icons and accepts instructions including an execution instruction and an edit instruction from a user. The display control program causes the processor to display an operation screen that accepts the execution instruction to execute a reading unit or a printing unit with the icon and an edit screen that accepts the edit instruction including a hide instruction with the icon on the operation panel in a switchable manner. The plurality of icons include a first icon set to the first setting by the hide instruction and a second icon set to the second setting by the hide instruction. When the edit screen is displayed, the display control program displays the first icon and the second icon on the operation panel in different display modes.

The user can grasp that different settings are made for the hide instruction. By recognizing icons with different settings, the user can reduce the operation of uniformly hiding a plurality of icons.

The function of the display control section may be realized by one or more processors or a semiconductor chip. For example, the display control section may be configured to further include a sub-processing device (co-processor) such as a system-on-a-chip (SoC), a micro control unit (MCU), and a field-programmable gate array (FPGA). The display control section may cooperate with both the CPU and the sub-processing device, or may selectively use one of the two to perform various controls.

The processing units of the flowcharts of FIG. 7 are divided according to the main processing contents in order to make the processing of the multifunction device easy to understand, and is not limited by the method and name of division of the processing unit. The processing of each step may be divided into more processing units depending on the processing content. One processing unit may be divided to include more processing. The order of processing may be appropriately changed as long as it does not interfere with the purpose.

Each embodiment may be executed in combination. As an example of different display modes of the first icon and the second icon, the first icon and the second icon may differ in both the color of the icon and the frame color of the icon.

When the user performs a drop operation in a state in which the first icon is selected by a user's touch operation and moved by a drag operation, and the first icon and the hide setting icon 130 are superimposed, the first icon is set to be hidden. However, in the second icon, even when the user performs a drop operation in a state in which the second icon is selected in the same way and moved by a drag operation, and the second icon and the hide setting icon 130 are superimposed, the second icon may not be set to be hidden by making a different behavior, or even when the second icon is selected and moved by a drag operation, the second icon may not enter a hidden area where the hide setting icon 130 is displayed, and may stop in front of the hidden area so that the second icon cannot be dropped on the hide setting icon 130. Even in this case, the user can move his or her finger to the hide setting icon 130, ignoring that the second icon has stopped, and release his or her finger at the position of the hide setting icon 130, but the user does not hide the second icon.

Although the display control method according to the present embodiment shows a case where the processor included in the multifunction device is realized by executing the display control program, the display control program executed by the processor in order to realize the display control method can be configured in the form of a recording medium recorded in a computer-readable manner or a transmission medium for transmitting the display control program. As the recording medium, a magnetic or optical recording medium or a semiconductor memory device can be used. Examples of the recording medium include a portable or fixed recording medium such as a flexible disk, HDD, a compact disk read only memory (CD-ROM), a digital versatile disk (DVD), a Blu-ray (registered trademark) disc, a magneto-optical disk, a flash memory, and a card type recording medium. The recording medium may be a non-volatile storage device such as a RAM, a ROM, or an HDD included in the multifunction device.

What is claimed is:

1. A multifunction device comprising:
a reading unit that reads a document;
a printing unit that performs printing on a medium;
an operation panel that accepts instructions including an execution instruction and an edit instruction from a user and displays an operation screen including a plurality of icons and an edit screen including the plurality of icons; and
a display control section that switches display of the operation panel to the operation screen or the edit screen, wherein
the execution instruction to execute a function using the reading unit or the printing unit is accepted by using the icon in the operation screen,
the edit instruction including a hide instruction to hide the icon desired by the user is accepted by using the icon in the edit screen,
the plurality of icons include a first icon and a second icon whose display modes displayed on the edit screen are different from each other,
the first icon and the second icon have different behaviors in response to the hide instruction,
the first icon is hidden in response to the hide instruction, and
the second icon asks the user whether to hide the second icon in response to the hide instruction.

2. The multifunction device according to claim 1, wherein the first icon and the second icon differ in at least one of a background color and a frame color of the icon displayed on the edit screen.

3. The multifunction device according to claim 2, wherein a color of the first icon and a color of the second icon displayed on the operation screen are the same as the background color and the frame color of the first icon displayed on the edit screen.

4. The multifunction device according to claim 1, wherein the hide instruction is an operation in which the user drags an icon and drops the icon in a hidden area.

5. A multifunction device comprising:
a reading unit that reads a document
a printing unit that performs printing on a medium;
an operation panel that accepts instructions including an execution instruction and an edit instruction from a user and displays an operation screen including a plurality of icons and an edit screen including the plurality of icons; and
a display control section that switches display of the operation panel to the operation screen or the edit screen, wherein
the execution instruction to execute a function using the reading unit or the printing unit is accepted by using the icon in the operation screen,
the edit instruction including a hide instruction to hide the icon desired by the user is accepted by using the icon in the edit screen,
the plurality of icons include a first icon and a second icon whose display modes displayed on the edit screen are different from each other,
the first icon and the second icon have different behaviors in response to the hide instruction,
the hide instruction is an operation in which the user drags an icon and drops the icon in a hidden area, and
the user is able to drag the first icon to the hidden area and drop the first icon in the hidden area, and the second icon is configured not to enter the hidden area even when the user drags the second icon.

6. The multifunction device according to claim 5, wherein the first icon is hidden in response to the hide instruction, and
the second icon maintains display even when the hide instruction is accepted.

7. A non-transitory computer-readable storage medium storing a display control program that displays a plurality of icons to each of which functions are assigned, the display control program comprising:
displaying an operation screen including a first icon and a second icon and an edit screen including the first icon and the second icon on a display in a switchable manner;
executing a function corresponding to a selected icon when the first icon and the second icon are selected by a user on the operation screen;
hiding the first icon in response to the user performing a first operation on the first icon on the edit screen;

continuing to display the first icon and asking the user whether to hide the second icon in response to the user performing the first operation on the second icon on the edit screen; and displaying the first icon and the second icon in different display modes when the edit screen is displayed.

* * * * *